(12) United States Patent
Mann et al.

(10) Patent No.: US 9,615,390 B2
(45) Date of Patent: Apr. 4, 2017

(54) PCRN SESSION ARCHITECTURE FOR ROAMING

(75) Inventors: Robert A. Mann, Carp (CA); Lui Chu Yeung, Kanata (CA); Haiqing Ma, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1292 days.

(21) Appl. No.: 13/275,647

(22) Filed: Oct. 18, 2011

(65) Prior Publication Data
US 2013/0097325 A1 Apr. 18, 2013

(51) Int. Cl.
*G06F 15/16* (2006.01)
*H04W 76/02* (2009.01)

(52) U.S. Cl.
CPC .................. *H04W 76/022* (2013.01)

(58) Field of Classification Search
CPC ..... H04L 65/1066; H04L 43/10; H04L 41/50; H04L 41/0816; H04L 41/0213; H04W 28/24; H04W 76/022
USPC .......................................... 709/227–228, 223
See application file for complete search history.

(56) References Cited

U.S. PATENT DOCUMENTS

| | | | |
|---|---|---|---|
| 2005/0198312 A1* | 9/2005 | Ashwood-Smith et al. | 709/228 |
| 2011/0138005 A1* | 6/2011 | Zhou et al. | 709/206 |
| 2011/0173332 A1* | 7/2011 | Li et al. | 709/227 |
| 2012/0210003 A1* | 8/2012 | Castro et al. | 709/225 |
| 2012/0271958 A1* | 10/2012 | Oh | 709/228 |
| 2012/0297076 A1* | 11/2012 | Wu et al. | 709/227 |
| 2012/0307794 A1* | 12/2012 | Shaheen et al. | 370/331 |
| 2013/0013794 A1* | 1/2013 | Hu et al. | 709/227 |

OTHER PUBLICATIONS

3GPP TS 29.212, v9.3.0 (2009), "3rd Generation Partnership Project; Technical Specification Group Core Network and Terminals; Policy and Charging Control Over Gx Reference Point (Release 9)", pp. 1-114.
3GPP TS 29.213, v8.6.0 (2009), "3rd Generation Partnership Project; Technical Specification Group Core Network and Terminals; Policy and Charging Control Signalling Flows and QoS Parameter Mapping (Release 8)", pp. 1-122.
3GPP TS 29.214 v9.2.0 (2009); "3rd Generation Partnership Project; Technical Specification Group Core Network and Terminals; Policy and Charging Control Over Rx Reference Point (Release 9)", pp. 1-44.
3GPP TS 29.215 v10.2.0 (2011), "3rd Generation Partnership Project; Technical Specification Group Core Network and Terminals; Policy and Charging Control (PCC) Over S9 Reference Point; Stage 3 (Release 10)", pp. 1-42.

* cited by examiner

*Primary Examiner* — Abdullahi E Salad
(74) *Attorney, Agent, or Firm* — Kramer & Amado, P.C.

(57) ABSTRACT

Various exemplary embodiments relate to a method performed by a node for creating a virtual IP-CAN session, the method including: receiving, at the network node, a S9 message; creating a S9 session; creating a virtual IP-CAN session associated with the S9 session; persisting the S9 session; and transmitting an answer S9 message.

22 Claims, 8 Drawing Sheets

PCRN SESSION ARCHITECTURE FOR ROAMING

RELATED APPLICATIONS

This application cross-references the following application, incorporated by reference herein, in its entirety: application Ser. No. 13/275,490, "INTEGRATION OF ROAMING AND NON-ROAMING MESSAGE PROCESSING" to Ma et al.; and application Ser. No. 13/275,515, "DIAMETER SESSION AUDITS" to Mann et al.

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, 3GPP TS 29.214, and 3GPP TS 29.215 describe the Policy and Charging Rules Function (PCRF), Policy and Charging Enforcement Function (PCEF), Bearer Binding and Event Reporting Function (BBERF) of the EPC, and Policy and Charging Control (PCC) Over S9 Reference Point. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a method performed by a node for creating a virtual IP-CAN session, the method including: receiving, at the network node, a S9 message; creating a S9 session; creating a virtual IP-CAN session associated with the S9 session; persisting the S9 session; and transmitting an answer S9 message.

Various exemplary embodiments relate to a method performed by a node for interacting with a virtual IP-CAN session associated with a roaming user equipment (UE), the method including: receiving a request message from an application function to provide application services to the roaming UE; finding the virtual IP-CAN session associated with the request; generating a Gx RAR; generating a S9 RAR message; and transmitting the S9 RAR message.

Various exemplary embodiments relate to a method performed by a tangible and non-transitory machine-readable storage medium encoded with instructions for execution by a node for creating a virtual IP-CAN session, the tangible and non-transitory machine-readable storage medium including: instructions for receiving, at the network node, a S9 message; instructions for creating a S9 session; instructions for creating a virtual IP-CAN session associated with the S9 session; instructions for persisting the S9 session; and instructions for transmitting an answer S9 message.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
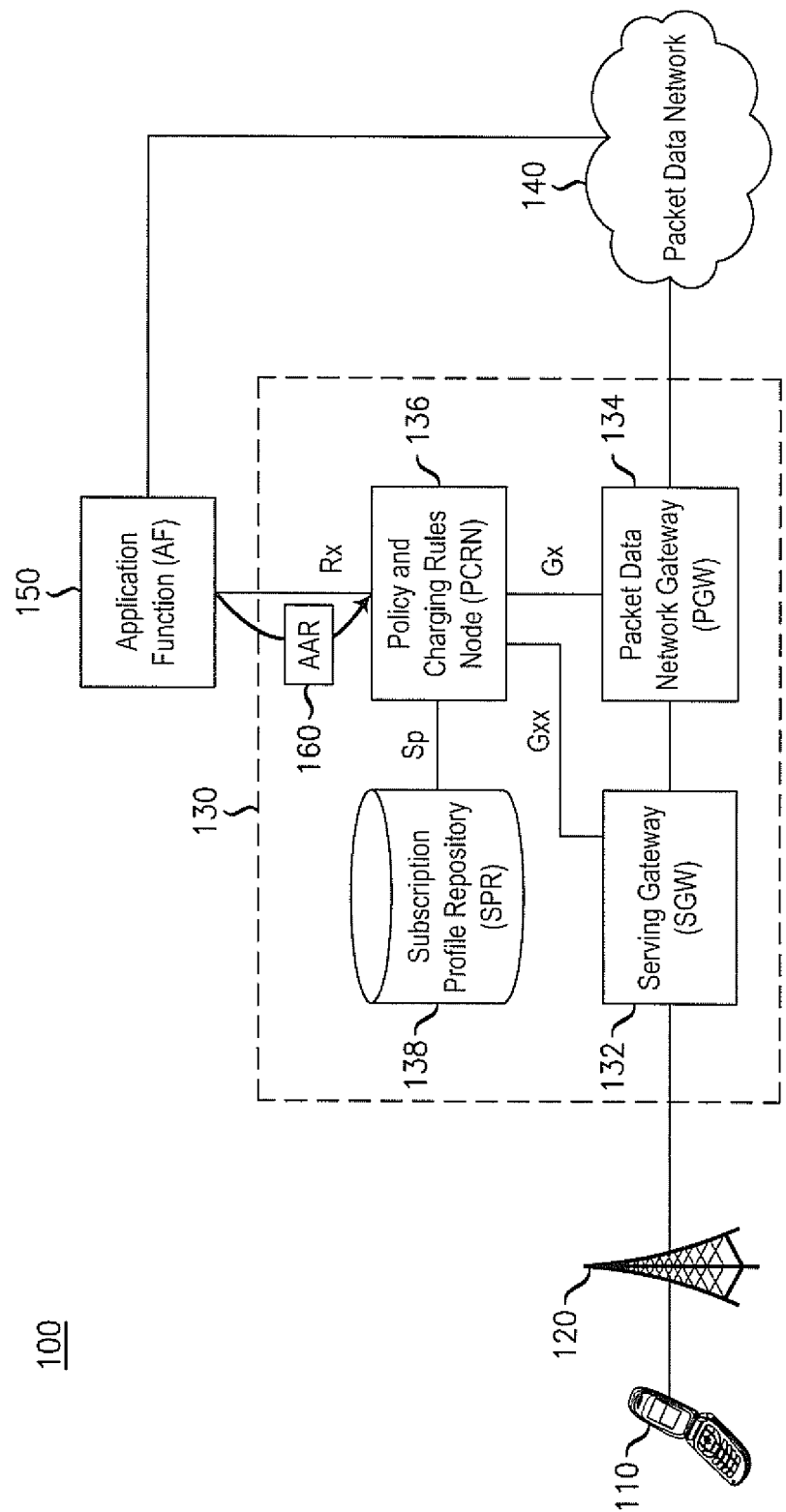
FIG. 1 illustrates an exemplary subscriber network for providing various data services.

When a subscriber roams onto a roaming network, a connection may be made between a visited policy and charging rule node (PCRN) and a home PCRN to control the usage of the visited and home network by the subscriber. The visited network may initiate a S9 session using the DIAMETER protocol to facilitate this connection. A PCRN architecture may beneficially implement policy and charging rules and actions by focusing on IP-CAN sessions. When a UE roams on a partner network, an IP-CAN session may be initiated on the visited PCRN and a S9 session may be initiated to allow communication between the visited and home PCRNs. In this situation, the home PCRN may have a S9 session but no related IP-CAN session. Accordingly, it may be desirable in this situation to create a virtual IP-CAN session associated with the S9 session and hence the IP-CAN session on the visited PCRN. The virtual IP-CAN session may then be processed and may interact with other nodes like an actual IP-CAN session. This has the benefit of have a single IP-CAN session PCRN architecture to handle roaming situations.

Referring now to the drawings, in which like numerals refer to like components or steps, there are disclosed broad aspects of various exemplary embodiments.

FIG. 1 illustrates an exemplary subscriber network 100 for providing various data services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SOW) 132, a packet data network gateway (POW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SOW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. POW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
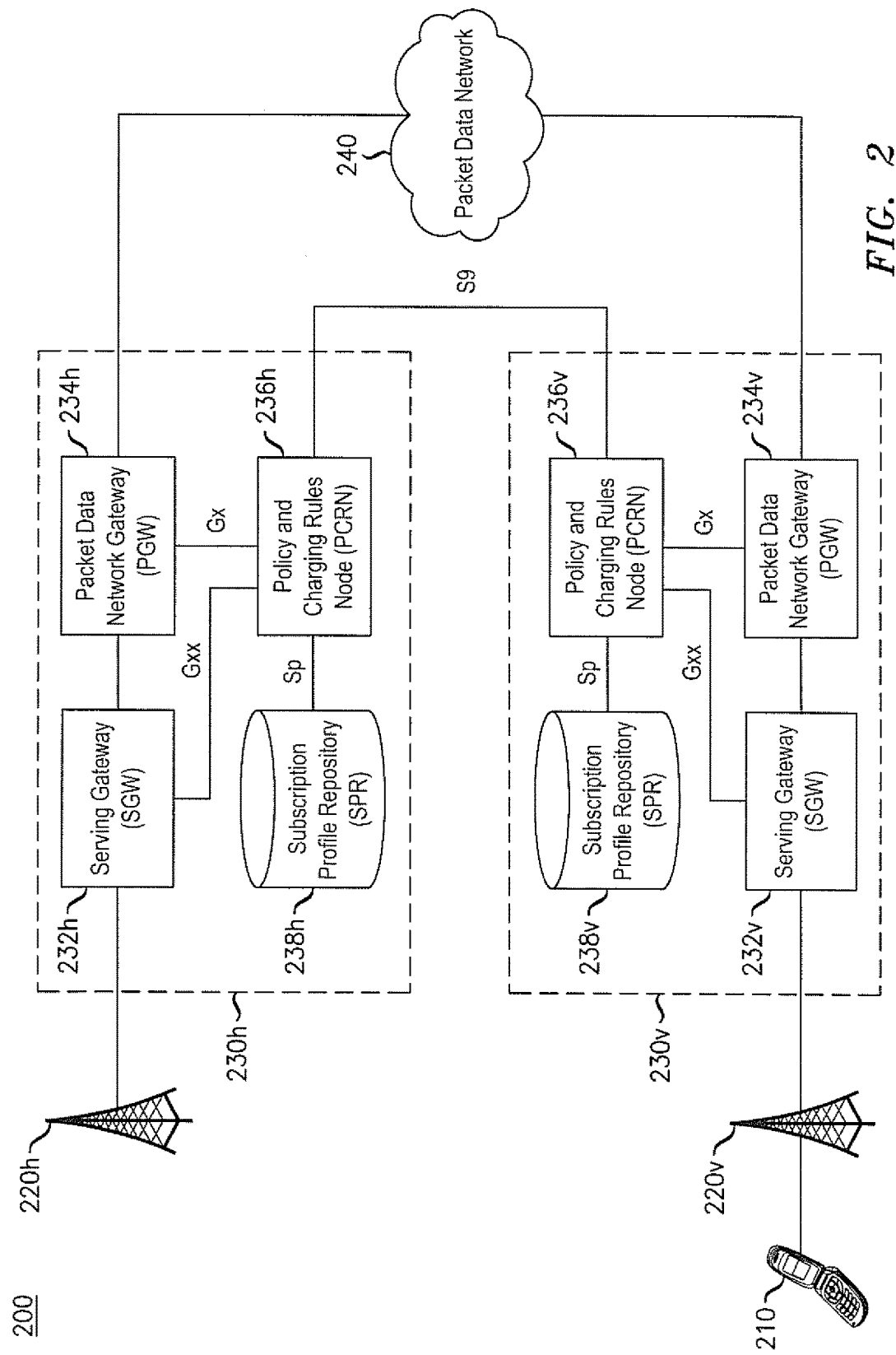
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. In various embodiments, EPC 230v and EPC 230h may connect to the same packet data network 240 (as shown) or may connect to two independent networks. Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) of the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via a S9 session.

In various embodiments, PCRN 236v may forward requests associated with UE 210 to PCRN 236h via a S9 session. PCRN 236h may process these messages to, for example, generate PCC and/or QoS rules. PCRN 236h may then forward these rules to PCRN 236v for installation on PGW 234v and/or SGW 232v. In the case of home-routed access, PCRN 236h may also install PCC rules directly on PGW 234h. In view of the cooperative nature of PCRNs 236h, 236v, these devices may be referred to as "partner devices" with respect to each other.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

In establishing a S9 session, PCRNs 236h, 236v may be configured to negotiate a set of features that will be supported for the session. In various embodiments, PCRNs 236h, 236v may each be configured to perform this negotiation with respect to a default set of features such as, for example, the set of all features supported by the device. In such embodiments, the negotiated set of supported features may simply be the set of all features supported by both devices.

Figure 3:
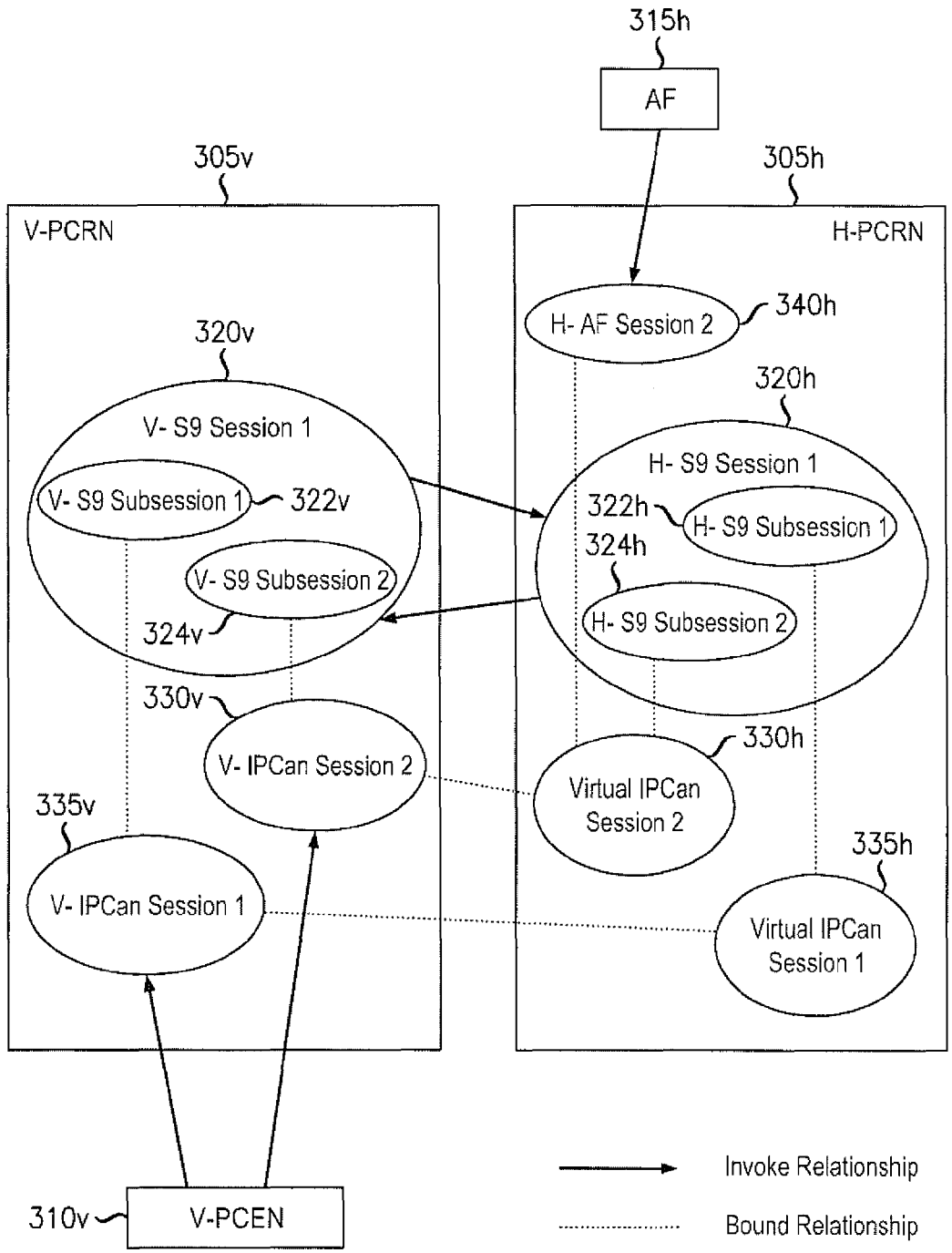
FIG. 3 is a block diagram illustrating a subscriber network for providing roaming access and its related S9 and IP-CAN sessions for visited access.

FIG. 3 is a block diagram illustrating a subscriber network for providing roaming access and its related S9 and IP-CAN sessions for visited access. Similar to the network in FIG. 2, the subscriber network 300 may include a visited PCRN (V-PCRN) 305v, visited PCEN (V-PCEN) 310v, home PCRN (H-PCRN) 305h, and application function (AF) 315h.

FIG. 3 illustrates visited access roaming where the V-PCRN 305v may include IP-CAN sessions V-IP-CAN session 1 335v and V-IP-CAN session 2 330v. The V-IP-CAN sessions 335v and 330v may result from a UE accessing the visited partner network and my result in the establishment of a S9 session V-S9 session 1 320v on the V-PCRN 305v. The V-S9 session 1 may include S9 subsessions: V-S9 subsession 1 322v may correspond to V-IP-CAN session 1 335v, and V-S9 subsession 2 324v may correspond to V-IP-CAN session 2 330v.

When the V-PCRN 305v initiates S9 session 1 with H-PCRN 305h, H-PCRN 305h initiates a S9 session H-S9 session 1 320h. Within H-S9 session 1, H-SC subsession 1 322h may be established to correspond to V-S9 subsession 1 322v and V-IP-CAN session 1335v. Also, H-S9 subsession 2 324h may be established to correspond to V-S9 subsession 2 324v and V-IP-CAN session 2 330v. At this point the H-PCRN 305h may establish virtual IP-CAN session 1 335h and virtual IP-CAN session 2 330h to allow the H-PCRN 305h to manage the UEs roaming on the visited network.

Figure 4:
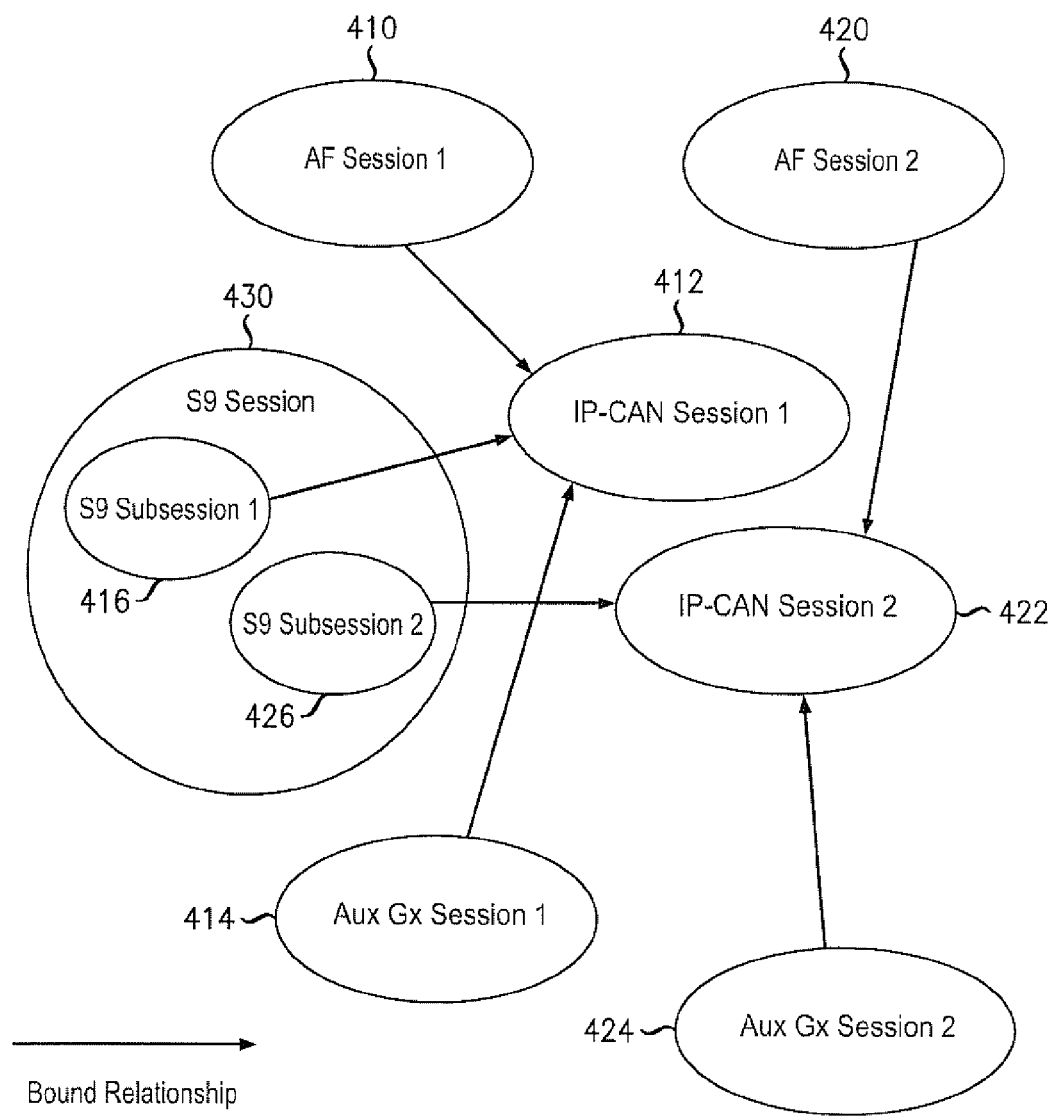
FIG. 4 is a diagram illustrating S9 and IP-CAN sessions for home access.

FIG. 4 is a diagram illustrating S9 and IR-CAN sessions for home access. As shown in FIG. 4, a H-PCRN may include AF session 1 410, AF session 2 420, virtual IP-CAN session 1 412, virtual IP-CAN session 2 422, Aux Session 1 414, Aux Session 2 424, S9 Session 430, S9 subsession 1 416, and S9 subsession 2 426.

In the home access scenario of FIG. 4, the H-PCRN may initiate a virtual IP-CAN session 1 412 that associates to AF Session 1 410, Aux Session 1 414, and S9 Subsession 1 416. Further, although not shown, there may be corresponding IP-CAN and S9 subsessions present on the partner V-PCRN. Likewise, virtual IP-CAN session 2 422 may have similar associated sessions.

Figure 5A:
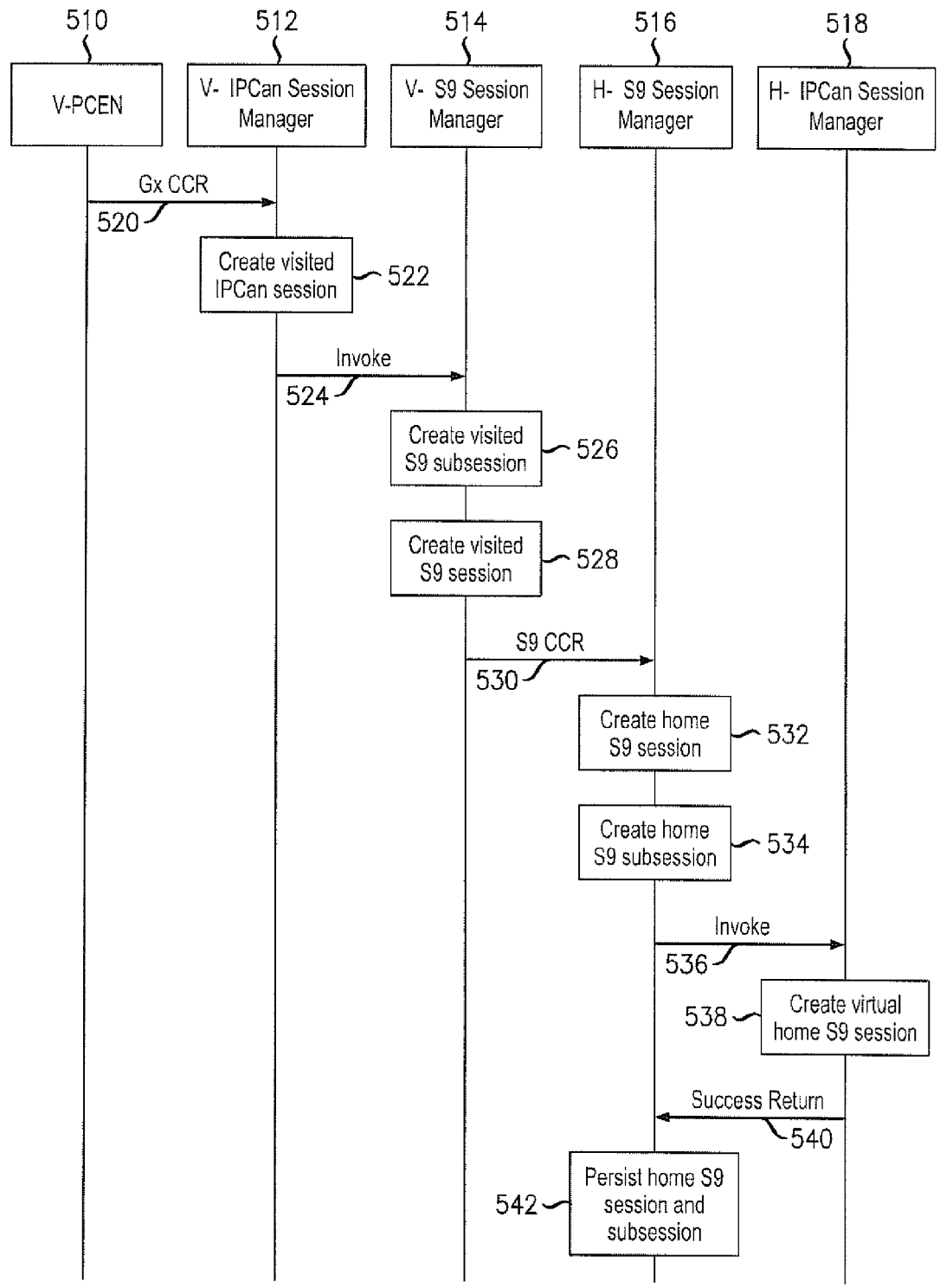
FIGS. 5A and 5B are a diagram illustrating the message flow for establishing a S9 session for visited access.
Figure 5B:
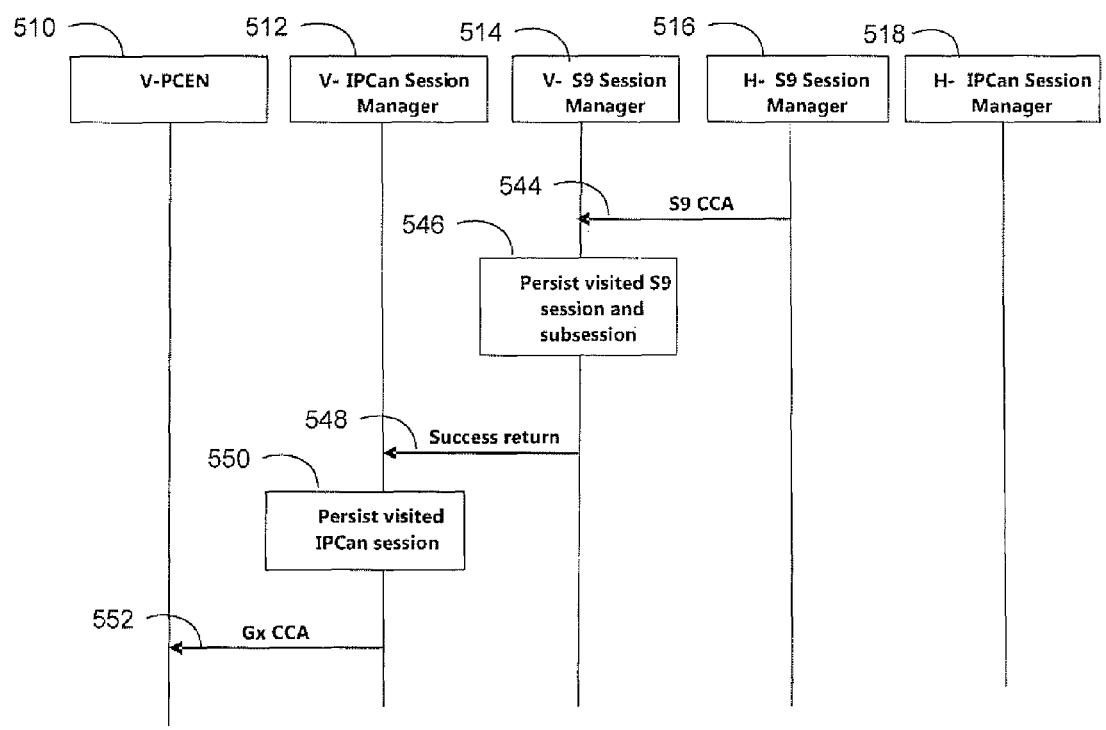

FIGS. 5A and 5B are a diagram illustrating the message flow for establishing a S9 session for visited access. FIGS. 5A and 5B may include visited PCEN (V-PCEN) 510, visited IP-CAN (V-IP-CAN) session manager 512, visited S9 (V-S9) session manager 514, home S9 (H-S9) session manager 516, and home IP-CAN (H-IP-CAN) session manager 518. The establishment of a S9 session for visited access may begin with the V-PCEN 510 sending a Gx CCR to a V-IP-CAN session manager 512. The V-IP-CAN session manager 512 may use the received Gx CCR to create a V-IP-CAN session 522. Once, the V-IP-CAN session is created, the V-IP-CAN session manager 512 may invoke the V-S9 session manager 524. The V-S9 session manager 514 may then create a V-S9 subsession 526 and a V-S9 session 528. Next, the V-S9 session manager 514 sends a S9 CCR to the H-S9 session manager 516 using the created S9 session 530.

The H-S9 session manager 516 may then create a H-S9 session 532 and H-S9 subsession 534. Once, the H-S9 session is created, the H-S9 session manager 516 may invoke the H-IP-CAN session manager 536. The H-IP-CAN session manager 518 may then create a virtual H-IP-CAN session 538. Then, the H-IP-CAN session manager 518 may indicate to the H-S9 session manager 516 the successful creation of the virtual H-IP-CAN session 540. Next, the H-S9 session manager 516 persists the H-S9 session and subsession 542. Persisting the sessions may include taking steps to insure that the sessions will persist over time, including for example storing key session information for use in case of a switch over to redundant hardware.

The H-S9 session manager 516 may then send a S9 CCA to the V-S9 session manager 514 that indicates the successful receipt of the S9 CCR that was previously received 544. The V-S9 session manager may next persist the V-S9 session and subsession 546. Then, the V-S9 session manager 514 indicates to the V-IP-CAN session manager 512 the successful creation of the S9 session and subsession 548. Next, the V-IP-CAN session manager 512 persists the V-IP-CAN session 550. Finally, the V-IP-CAN session manager 512 sends a Gx CCA to the V-PCEN 510 that indicates the successful receipt of the Gx CCR 552.

Figure 6A:
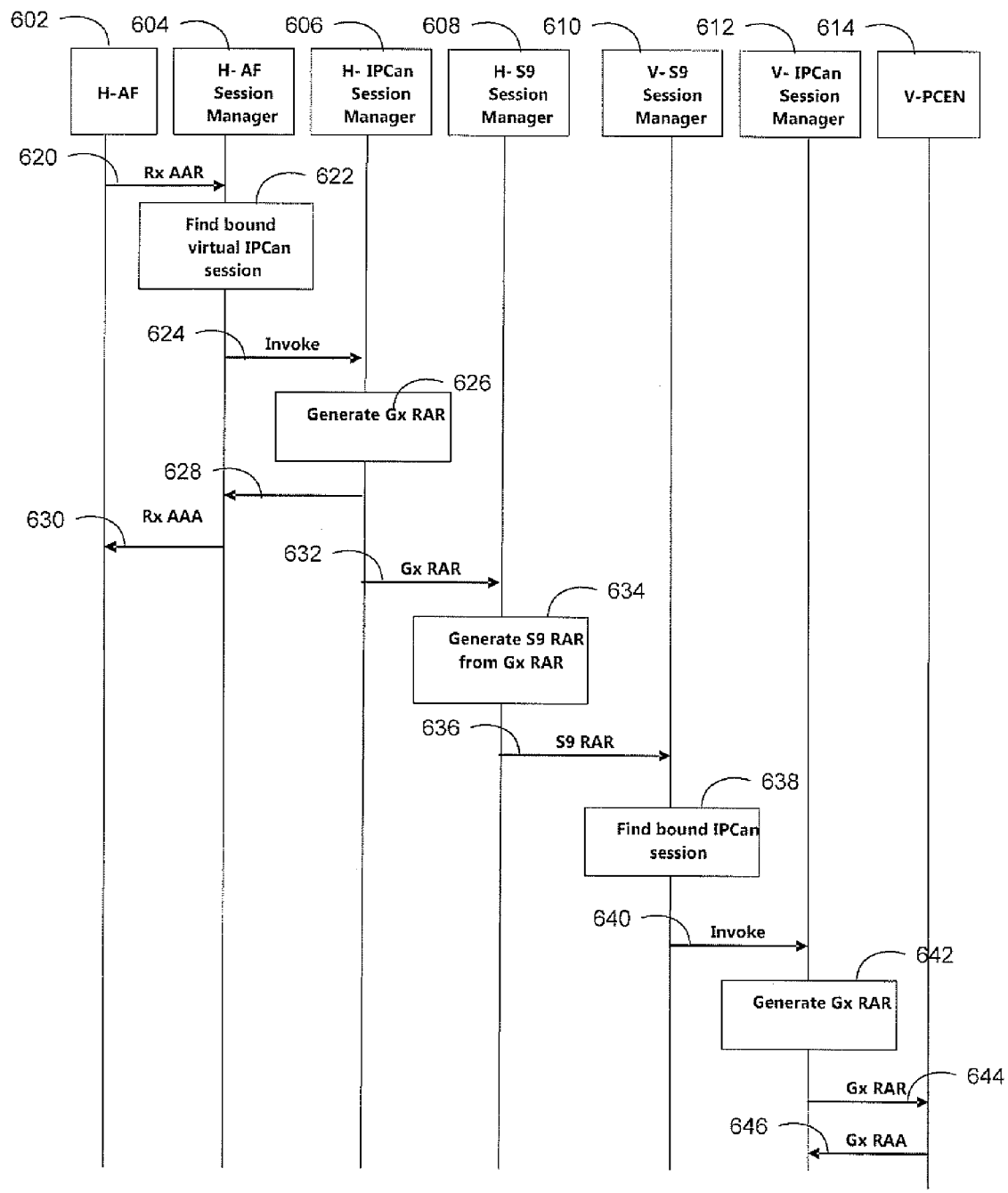
FIGS. 6A and 6B are a diagram illustrating the message flow for installing PCC rules on a visited network PCEN for a home access AF session.
Figure 6B:
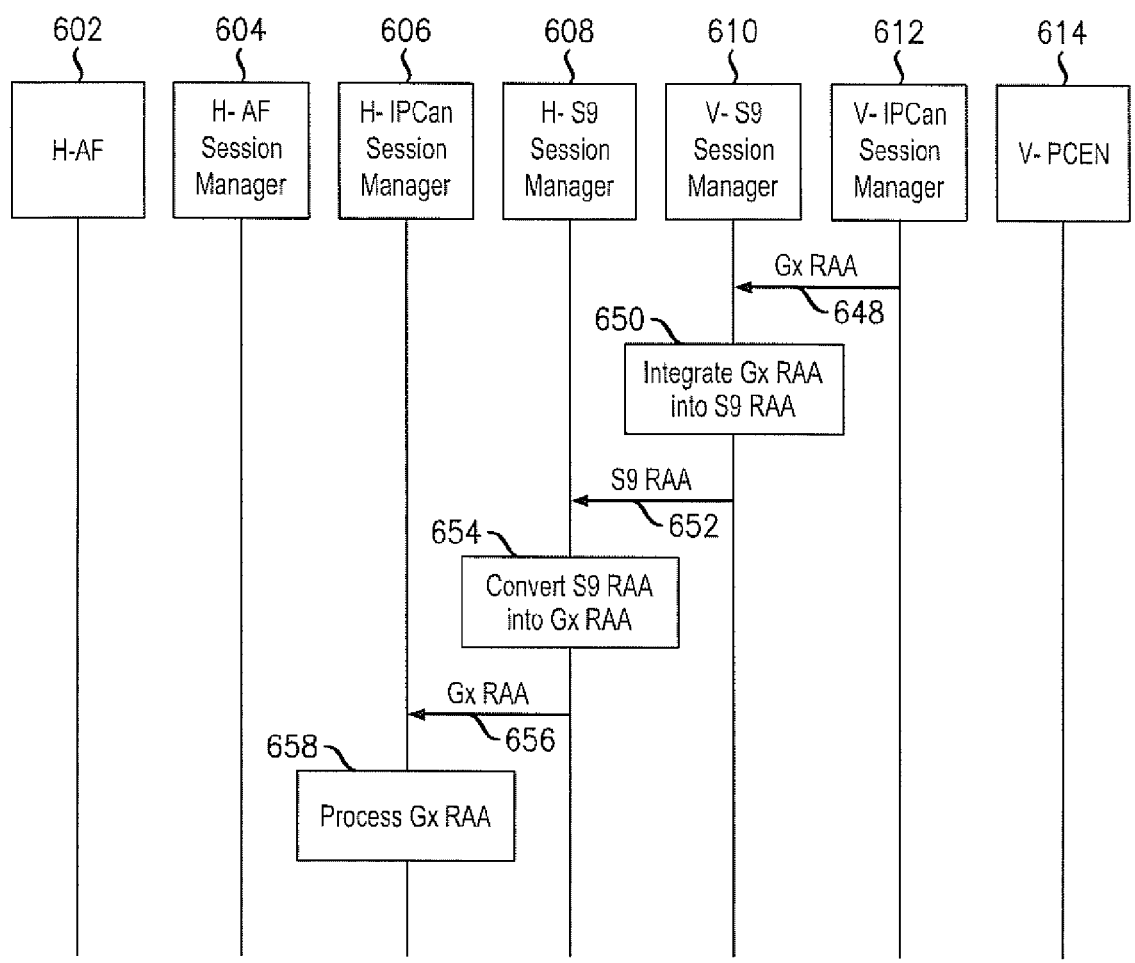

FIGS. 6A and 6B are a diagram illustrating the message flow for installing PCC rules on a visited network PCEN for a home access AF session. FIGS. 6A and 6B may include home AF (H-AF) 602, H-AF session manager 604, home IP-CAN (H-IP-CAN) session manager 606, home S9 (H-S9) session manager 608, visited S9 (V-S9) session manager 610, visited IP-CAN (V-IP-CAN) session manager 612, and visited PCEN (V-PCEN) 614. The installation of PCC rules on a visited network for a home access AF session may begin with the H-AF 602 sending a Rx AAR to H-AF session manager 604. The H-AF session manager 604 may find a bound home virtual IP-CAN session corresponding to the Rx AAR 622. Once the virtual home IP-CAN session is found, the H-AF session manager 604 may invoke the H-IP-CAN session manager 626. The H-IP-CAN session manager 606 may then generate a GX RAR 626. The H-IP-CAN session manager 606 may then indicate to the H-AF session manager 604 the successful receipt of the RX AAR message. The H-AF session manager 604 may then generate and send a Rx AAA to the H-AF 630. Alternatively, steps 628 and 630 may also be done later in this method.

The H-IP-CAN session manager 606 may also send the Gx RAR to the H-S9 session manager 632. Next, the H-S9 session manager 608 may generate a S9 RAR from the Gx RAR 634. The H-S9 session manager 608 may then send the S9 RAR to the V-S9 session manager 636. The V-S9 session manager 610 may find a bound V-IP-CAN session corresponding to the S9 RAR 638. Once the bound V-IP-CAN session is found, the V-S9 session manager 610 may invoke the V-IP-CAN session manager 640. Then the V-IP-CAN session manager 612 may generate a Gx RAR 642. The V-IP-CAN session manager 612 may send the Gx RAR message to the V-PCEN 644. The V-PCEN 614 may install rules and policies based upon the received Gx RAR message. The V-PCEN 614 then sends a Gx RAA back to the V-IP-CAN session manager 612 indicating and answer to the Gx RAR 646.

The V-IP-CAN session manager 612 may then send the Gx RAA to the V-S9 session manager 610. The V-S9 session manager 610 next may integrate the Gx RAA into a S9 RAA 650. The V-S9 session manager 610 may then send the S9 RAA to the H-S9 session manager 652. Then the H-S9 session manager 608 may convert the S9 RAA into a GX RAA 654. The H-S9 session manager 608 may send the Gx RAA to the H-IP-CAN session manager 656. Finally, the H-IP-CAN session manager 606 may process the Gx RAA.

The embodiments illustrated in FIGS. 5A, 5B, 6A, and 6B provide examples of how virtual IP-CAN sessions may be used to support roaming in subscriber networks. Other types of services and messages may also be used with virtual IP-CAN sessions in order to support the delivery of services to roaming UEs. Further, the method and message flow illustrated in FIGS. 6A and 6B may occur after the method and message flow illustrated in FIGS. 5A and 5B.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node for creating a virtual IP-CAN session, the method comprising:
    receiving, at the network node, a S9 message;
    creating a S9 session;
    creating the virtual IP-CAN session associated with the S9 session;
    persisting the S9 session; and
    transmitting an answer S9 message.

2. The method of claim 1, further comprising:
    creating a S9 subsession.

3. The method of claim 2, wherein the S9 subsession is associated with the virtual IP-CAN session.

4. The method of claim 3, further comprising a plurality of S9 subsessions and a plurality of virtual IP-CAN sessions, wherein each of the plurality of S9 subsessions corresponds to one of the plurality of virtual IP-CAN sessions.

5. The method of claim 1, wherein the S9 message is a CCR.

6. The method of claim 5, wherein the answer S9 message is a CCA.

7. The method of claim 1, wherein the virtual IP-CAN session corresponds to a roaming UE that subscribes to the network node.

8. The method of claim 7, further comprising:
receiving a request message from an application function to provide application services to the roaming UE; and
associating the request message with the virtual IP-CAN session.

9. The method of claim 8, further comprising:
generating a Gx RAR;
generating a S9 RAR message; and
transmitting the S9 RAR message.

10. The method of claim 9, further comprising:
generating a Rx AAA message; and
transmitting the Rx AAA to the application function.

11. A method performed by a node for interacting with a virtual IP-CAN session associated with a roaming user equipment (UE), the method comprising:
receiving a request message from an application function to provide application services to the roaming UE;
finding the virtual IP-CAN session associated with the request;
generating a Gx RAR;
generating a S9 RAR based upon the Gx RAR; and
transmitting the S9 RAR.

12. The method of claim 11, further comprising:
generating a Rx AAA; and
transmitting the Rx AAA to the application function.

13. A tangible and non-transitory machine-readable storage medium encoded with instructions for execution by a network node for creating a virtual IP-CAN session, the tangible and non-transitory machine-readable storage medium comprising:
instructions for receiving, at the network node, a S9 message;
instructions for creating a S9 session;
instructions for creating the virtual IP-CAN session associated with the S9 session;
instructions for persisting the S9 session; and
instructions for transmitting an answer S9 message.

14. The tangible and non-transitory machine-readable storage medium of claim 13, further comprising:
instructions for creating a S9 subsession.

15. The tangible and non-transitory machine-readable storage medium of claim 14, wherein the S9 subsession is associated with the virtual IP-CAN session.

16. The tangible and non-transitory machine-readable storage medium of claim 15, further comprising a plurality of S9 subsessions and a plurality of virtual IP-CAN sessions, wherein each of the plurality of S9 subsessions corresponds to one of the plurality of virtual IP-CAN sessions.

17. The tangible and non-transitory machine-readable storage medium of claim 13, wherein the S9 message is a CCR.

18. The tangible and non-transitory machine-readable storage medium of claim 17, wherein the answer S9 message is a CCA.

19. The tangible and non-transitory machine-readable storage medium of claim 13, wherein the virtual IP-CAN session corresponds to a roaming UE that subscribes to the network node.

20. The tangible and non-transitory machine-readable storage medium of claim 19, further comprising:
instructions for receiving a request message from an application function to provide application services to the roaming UE; and
instructions for associating the request message with the virtual IP-CAN session.

21. The tangible and non-transitory machine-readable storage medium of claim 20, further comprising:
instructions for generating a Gx RAR;
instructions for generating a S9 RAR message; and
instructions for transmitting the S9 RAR message.

22. The tangible and non-transitory machine-readable storage medium of claim 21, further comprising:
instructions for generating a Rx AAA message; and
instructions for transmitting the Rx AAA to the application function.

* * * * *